UNITED STATES PATENT OFFICE.

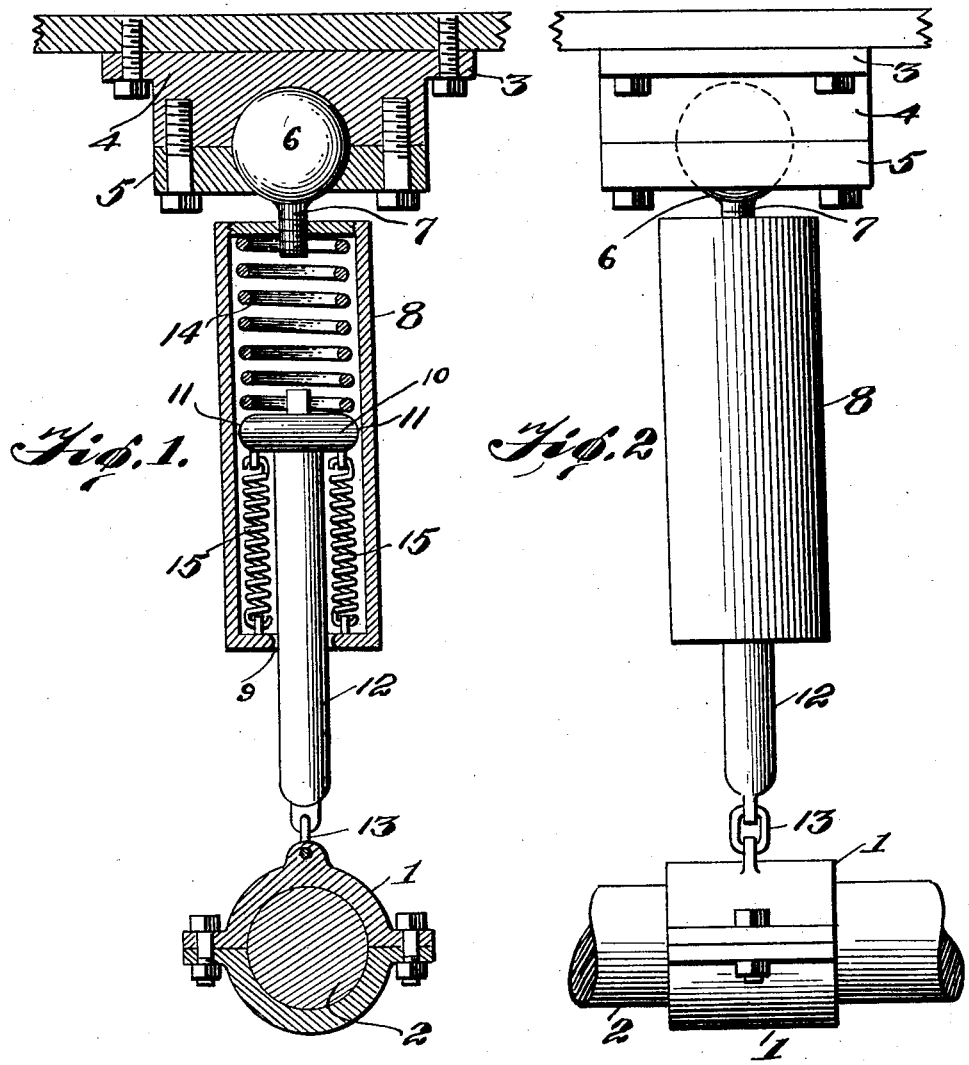

GEORGE M. BICKNELL, OF DETROIT, MICHIGAN, AND HUGH H. C. WEED, OF ST. LOUIS, MISSOURI, ASSIGNORS TO THE CARTER CARBURETER COMPANY, OF ST. LOUIS, MISSOURI, A CORPORATION OF MISSOURI.

FLOATING BEARING.

1,324,378.  Specification of Letters Patent.  Patented Dec. 9, 1919.

Application filed July 15, 1918. Serial No. 245,015.

*To all whom it may concern:*

Be it known that we, GEORGE M. BICKNELL and HUGH H. C. WEED, citizens of the United States, and residing at Detroit, in the county of Wayne, Michigan, and at St. Louis, Missouri, respectively, have invented certain new and useful Improvements in Floating Bearings, of which the following is a specification.

This invention relates to attachments for bearings adapted for application to rotating shafts, and more particularly to shafts which are subjected to high speed rotation. The primary object of the invention is the prevention of the whipping of shafts.

The generally accepted idea of the so-called whipping is the tendency of high speed shafting to travel, in response to centrifugal force, in a circle larger than the diameter of the shaft. This circular travel is in addition to the rotation of the shaft under applied power. The shafts are ordinarily held in fixed bearings, generally at least two in number, and the portions of the shaft which are subject to the whipping action are located between the fixed bearings. The circle of travel of the whipping portions would manifestly be around a center which is the center of the shaft when it is at rest. It will be very readily understood that the whipping action is exceedingly destructive to the fixed bearings and to the shaft itself.

As before stated, a whipping shaft travels in a circle larger than its own diameter. Our conception is that any discouragement of the tendency of the shaft to travel in a true circle, by destroying or retarding its continuity of movement, or impulse in a fixed circular direction, will tend to cause the shaft to more nearly assume its normal straight alinement.

The invention is especially adapted for automobile shafting but it is to be clearly understood that it may be advantageously used on any high speed shafts. In automobile drive shafts a very large percentage of the destructive wear on universal joints is occasioned by shaft whipping. This wear has caused the adoption of heavier drive shafts, of abnormal diameter, which manifestly do not whip to so great an extent, because less resilient, but has occasioned a very material increase in cost of production. These heavier shafts are also objectionable in that they add to the burden of the universal joint. With the use of my invention, a long drive shaft of normal diameter will show a smaller degree of whipping tendency, and consequently cause less wear upon the bearings, than will a shaft of the same length and of abnormally large diameter.

We have observed that the whipping action is better retarded by opposing unequal resistance to the tendency of the shaft to swing in a circle. A fixed resistance of the tendency to travel to the left, for instance, should be met by either a greater or less resistance to travel to the right. Moreover, it is obvious that, in order for the shaft to travel in a circular path, the whipping portion must move upwardly and downwardly, at some point in the circle. This resistance may be applied as desired, but it is to be noted that, if equal resistance is moderately applied to movement on all directions, the whipping action will not be entirely eliminated.

Our invention therefore, by providing unequal resistance to shaft movement in different directions, renders a true circular or "whipping" movement impossible, offering at the same time no resistance to the rotative movement within the bearings.

In the accompanying drawings forming a part of this specification, we have illustrated a preferred embodiment of our invention, and have chosen to illustrate the invention applied to the drive shaft of an automobile.

In the drawings—

Figure 1 is a plan view showing our device; and

Fig. 2 is a side elevation.

The device comprises a preferably split bearing 1 adapted to surround the shaft 2. Fixed to any convenient portion of an automobile, such as a cross-member, is a bracket 3 made up of socket members 4 and 5, as shown in Fig. 1. Within the socket formed by the members 4 and 5, is a ball 6, provided with a screw-threaded shank 7.

A cylinder 8, having a screw-threaded aperture at the top, is secured to the projecting end of the shank 7, the lower end of the cylinder being centrally apertured at 9. Reciprocably mounted within the cylinder 8, is a piston 10, the outer periphery 11 of which is rounded as shown. The piston is provided with a shaft 12 which passes through the aperture 9, and is pivotally connected to the bearing 1, by a link 13, or other pivoted connection.

Mounted in the cylinder 8, above the piston 10, is a coiled spring 14, the ends of the spring engaging the top of the cylinder and of the piston. Below the piston head, and upon each side of the shaft 12, is mounted a spring 15. The combined strength of both springs 15 is considerably less than that of the spring 14.

From the foregoing it will be clear that we have devised means for preventing the shaft from traveling bodily in a circular path. Any vertical movement of the shaft upwardly will be resisted by the strong spring 14. A similar movement downwardly will be resisted, but to a less extent, by the two springs 15, 15. Hence there is an unequal resistance to vertical movement in opposite directions. Lateral movement of the bearing in any direction is permitted by the ball and socket connection of the cylinder 8. Moreover this lateral movement will tend to rock the piston 10 in the cylinder and will alternately compress each of the springs 15, 15, and absorb the shocks, thereby preventing rupture of the several parts of the device. The three springs tend to hold the piston and shaft in their proper positions, and prevent undesirable vibrations thereof.

It is obvious that in actual practice of the invention, lubricating devices, such as oil cups, should be applied to all points where there is frictional contact. Since these devices form no part of our invention, they are not shown in all instances where they would be necessary.

Various modifications of the invention may be suggested to those skilled in the art to which the invention appertains, but we desire to secure by Letters Patent all such embodiments thereof as fall fairly within the scope of the appended claims.

It is to be understood that, while we have shown a member mounted to assume a vertical position adjacent the shaft, the member might just as well be mounted to extend laterally above or below the shaft. In this event, the lateral movement of the member, the bearing, or the shaft, as herein described, both in the specification and claims, might properly be termed a vertical movement, and vice-versa. The appended claims cover this mechanical equivalent.

What we claim is:—

1. A device of the character described comprising, in combination with a rotatable shaft, a floatable bearing engaging the shaft, of an element pivoted for universal lateral movement and connected to the bearing, and spring members carried by said element for resisting lateral movement of the bearing.

2. A device of the character described comprising, in combination with a rotatable shaft, a floatable bearing engaging the shaft, of an element pivoted for universal lateral movement and connected to the bearing, and spring members carried by said element for unequally resisting lateral movement of the bearing.

3. A device of the character described comprising, in combination with a rotatable shaft, a floatable bearing engaging the shaft, a cylinder mounted for lateral movement, and having a piston therein connected to the bearing, and a spring in the cylinder adapted for contact with the piston and to resist vertical movement of the bearing.

4. A device of the character described comprising, in combination with a rotatable shaft, a floatable bearing engaging the shaft, a cylinder mounted for lateral movement, and having a piston therein connected to the bearing, a spring in the cylinder adapted for contact with the piston and to resist vertical movement of the bearing, and other spring members resisting vertical movement of the bearing in an opposite direction.

5. A device of the character described comprising, in combination with a rotatable shaft, of a floatable bearing engaging the shaft, of an element pivoted for universal lateral movement and connected to the bearing, and means carried by said element for unequally resisting vertical movement of the bearing.

6. A device of the character described comprising, in combination with a rotatable shaft, of a floatable bearing engaging the shaft, an element pivoted for universal lateral movement and connected to the bearing, and means carried by said element for unequally resisting lateral and vertical movement of the bearing in opposite directions.

In testimony whereof we affix our signatures.

GEORGE M. BICKNELL.
HUGH H. C. WEED.